US009483676B2

(12) United States Patent
Kawaji (10) Patent No.: US 9,483,676 B2
(45) Date of Patent: Nov. 1, 2016

(54) INFORMATION ACQUIRING METHOD AND INFORMATION PROVISION APPARATUS BOTH OF WHICH ARE BASED ON AUGMENTED REALITY (71) Applicant: KYOCERA Document Solutions Inc., Osaka (JP)

(72) Inventor: Masahiro Kawaji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/872,030

(22) Filed: Sep. 30, 2015

(65) Prior Publication Data
US 2016/0092710 A1 Mar. 31, 2016

(30) Foreign Application Priority Data

Sep. 30, 2014 (JP) ................................. 2014-201612

(51) Int. Cl.
*G06K 7/10* (2006.01)
*H04W 4/02* (2009.01)
*H04W 4/00* (2009.01)
*G06K 7/14* (2006.01)
*H04W 88/02* (2009.01)

(52) U.S. Cl.
CPC ......... *G06K 7/10722* (2013.01); *G06K 7/1417* (2013.01); *H04W 4/001* (2013.01); *H04W 4/027* (2013.01); *H04W 88/02* (2013.01)

(58) Field of Classification Search
USPC .................. 235/472.01, 462.11, 383, 375
See application file for complete search history.

(56) References Cited

U.S. PATENT DOCUMENTS

| 6,542,083 | B1 * | 4/2003 | Richley | ..................... G01S 5/16 340/10.42 |
| 8,434,674 | B2 * | 5/2013 | Mangione-Smith | .......... 235/375 |
| 9,235,604 | B2 * | 1/2016 | Ma | ..................... G06F 17/30265 |

FOREIGN PATENT DOCUMENTS

WO    WO2008040004    4/2008

* cited by examiner

*Primary Examiner* — Ahshik Kim
(74) *Attorney, Agent, or Firm* — Hawaii Patent Services; Nathaniel K. Fedde; Kenton N. Fedde (57) ABSTRACT To provide a non-transitory computer-readable recording-medium storing an information acquiring program (IAP) that can be implemented by a computer controlling a mobile terminal (MT). The IAP includes five program codes (PCDs). The $1^{st}$-PCD causes the computer to use a camera for capturing an on-printed-matter marker. The $2^{nd}$-PCD causes the computer to detect a mobile state of the MT. The $3^{rd}$-PCD causes the computer to recognize the mark for creating a provision request based on recognition information of the recognized marker and mobile information representing the MT's mobile state detected by the $2^{nd}$-PCD. The $4^{th}$-PCD causes the computer to transmit the provision request to an information provision apparatus and to receive indication information as a reaction to the provision request from the IA. The $5^{th}$-PCD causes the computer to create image information (II) based on the indication information and causes a display part to display the II.

11 Claims, 6 Drawing Sheets

INFORMATION ACQUIRING METHOD AND INFORMATION PROVISION APPARATUS BOTH OF WHICH ARE BASED ON AUGMENTED REALITY

INCORPORATION BY REFERENCE

This application is based on and claims the benefit of priority from Japanese Patent Application No. 2014-201612 filed on Sep. 30, 2014, the contents of which are hereby incorporated by reference.

BACKGROUND

The present disclosure relates to an information acquiring method and an information provision apparatus both of which use an AR (Augmented Reality) marker.

A technology for acquiring a desired information piece is known which is configured to read a 2D code such as a QR Code (Registered Trademark) using a mobile terminal such as s smart phone terminal or a tablet terminal without having to perform an input operation such as Internet URL (Uniform Resource Locator) inputting.

In addition, as a typical case to which such a technology is applied, an apparatus for inquiring and providing a code triggered information piece is known. In this technology, when the mobile terminal scans the 2D code such as QR Code (Registered Trademark), the time instant and the location are determined. Then, a scanned message is created that includes the scanned code and is transmitted to a server. The server selects an advertising content of a response message from an information base. Then, the server transmits related contents to the mobile terminal.

SUMMARY

Anon-transitory computer-readable recording medium according to an embodiment of the present disclosure, stores an information acquiring program executable by a computer that controls a mobile terminal. The information acquiring program includes a first to fifth program codes. The first program code causes the computer to use a camera to thereby capture an image of a marker on a printed matter. The second program code causes the computer to detect a mobile state of the mobile terminal. The third program code causes the computer to recognize the marker for creating a provision request based on recognition information of the recognized mark and mobile information representing the mobile state of the mobile terminal which is detected by the second program code. The fourth program code causes the computer to transmit the provision request to an information provision apparatus and to receive indication information as a reaction to the provision request from the information provision apparatus. The fifth program code causes the computer to create information image based on the indication information and causes a display part to display the information image.

An information apparatus according to an embodiment of the present disclosure includes a communication module that receives a provision request from a mobile terminal which is based on a recognition information piece of a marker on a printed matter and a mobile information piece of the mobile terminal, a provision request identification part that identifies the recognition information piece and the mobile information piece from the provision request, and an indication information acquiring part that acquires an indication information piece from a database which corresponds to a combination of the recognition information piece and the mobile information piece, the indication information acquiring part transmits the indication information piece to the mobile terminal via the communication module.

DETAILED DESCRIPTION

Hereinbelow, with reference to FIG. 1 to FIG. 6, an exemplary embodiment of an information acquiring program and an information provision apparatus according to the present disclosure will be described. It is to be noted that in the following description as a mobile terminal, a smartphone terminal or a tablet terminal is available.

Figure 1:
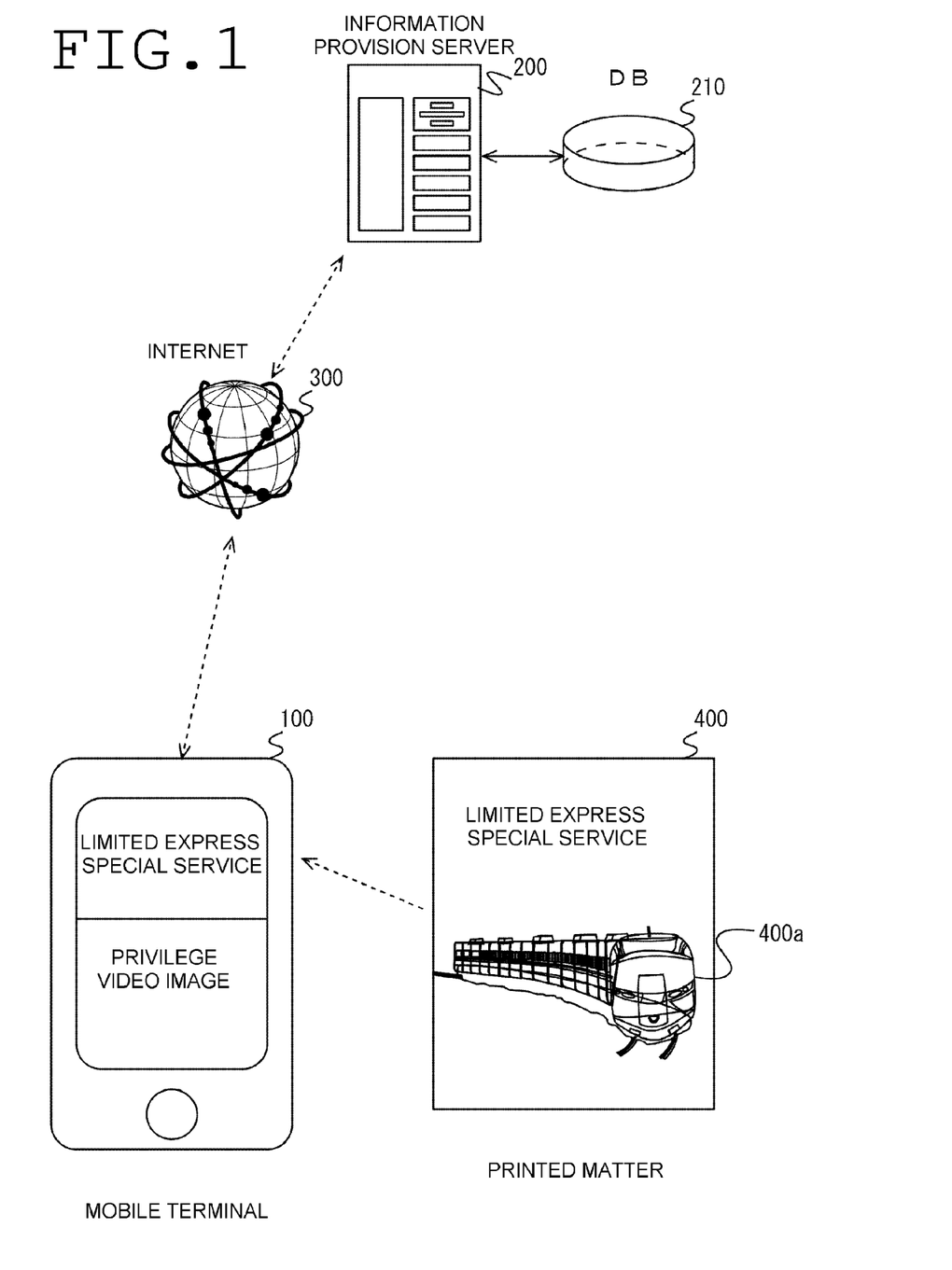
FIG. 1 illustrates an example of an information provision system configuration to which are applied an information acquiring program and an information provision apparatus, each being configured according to an exemplary embodiment of the present disclosure.

First of all, FIG. 1 illustrates an example of an information provision system configuration to which are applied an information acquiring program and an information provision apparatus, each being configured according to an exemplary embodiment of the present disclosure. The information provision system includes a mobile terminal 100 and an information provision server 200 having a DB 220 (data base). The mobile terminal 100 and the information provision server 200 are connected with each other via an INTERNET 300.

The mobile terminal 100 is provided with a display part 131, a camera 130 (that will be described later), and the like. Details of the mobile terminal 100 will be described later. The camera 130 captures an AR (Augmented Reality) marker 400*a* on a printed matter 400. Thereby, a real space image and a CG image that is created by, for example, a CG (computer graphics) are composited. Then, the resulting or composite image is displayed on the display part 131. That is, the CG image appears on the captured AR marker 400*a*. It is to be noted that the CG image is a still picture, animation, text, or the like.

The mobile terminal 100 may also output a voice sound in addition to the CG image. The AR marker 400*a* is not limited to be on the printed matter 400. The printed matter 400 per se is available as the AR marker 400*a*. Also, the CG image that is to be displayed on the display part 131 is created at a side of the mobile terminal 100. This creation is based on AR display information that is provided from the information provision server 200 in response to a provision request.

The information provision server 200 receives the provision request from the mobile terminal 100. Then, the information provision server 200 reads out the AR display information from the DB 220 which corresponds to the provision request and transmits the resulting AR display information to the mobile terminal 100. In other words, DB 220 stores various kinds of AR display information that correspond to recognition information pieces of the AR marker 400a. In addition, the various kinds of AR display information include one that corresponds to a mobile information piece that is indicative of a mobile state of the mobile terminal 100. The mobile information piece represents an acceleration information piece or a location transition information pieces which are detected or determined by an acceleration sensor 133 or a GPS sensor 134 which will be detailed later. The mobile information piece is included in the provision request from the mobile terminal 100. The various kinds of AR display information may include an information piece that corresponds to a time information piece associated with the mobile state. The time information piece is also included in the provision request from the mobile terminal 100. In summary, The AR display information is a combination of one or more of the following information pieces. The information piece corresponds to only the recognition information piece of the AR marker 400a. The information piece corresponds to a combination of the recognition information piece of the AR marker 400a and the mobile information piece of the mobile terminal 100. This mobile information piece is an information piece that is indicative of the location transition detected by the GPS sensor 134. The information piece corresponds to a combination of the recognition information piece of the AR marker 400a, the mobile information piece of the mobile terminal 100, and the time information piece associated with the mobile information. This mobile information piece is an information piece that is indicative of the acceleration or the location transition detected by the acceleration sensor 133 or the GPS sensor 134, respectively.

Figure 2:
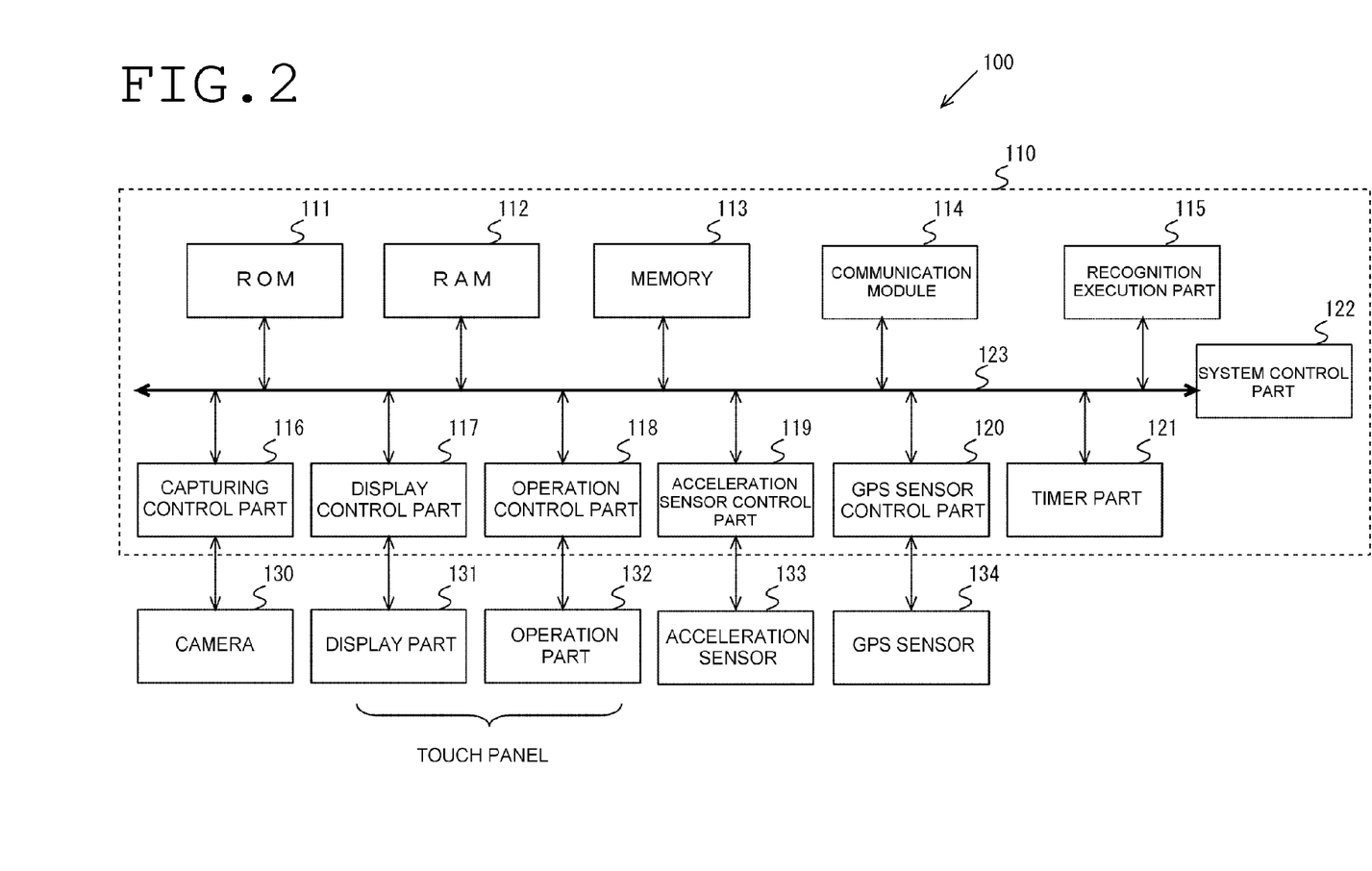
FIG. 2 illustrates an example of a configuration of a mobile terminal that is illustrated in FIG. 1.
Figure 3:
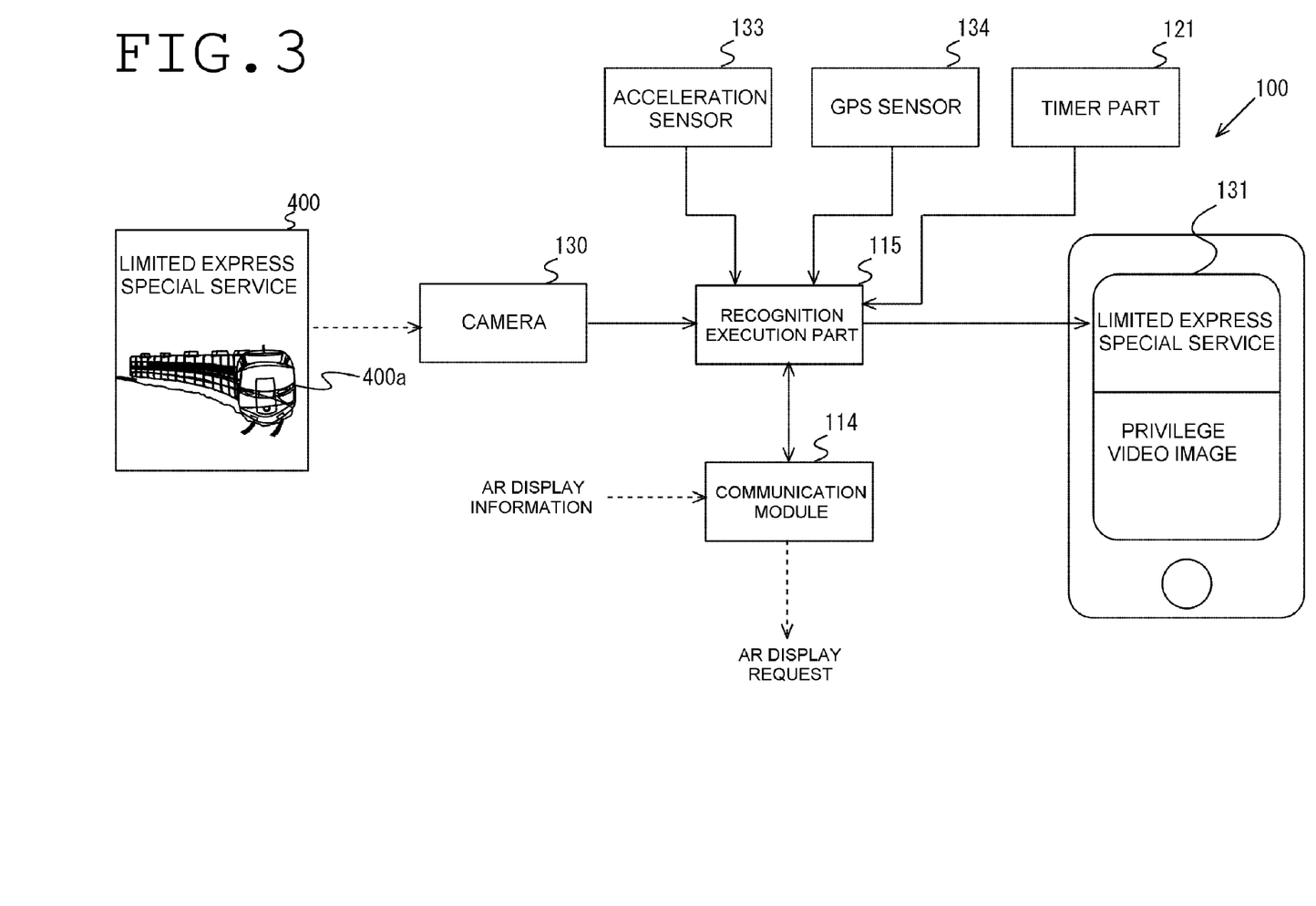
FIG. 3 illustrates an example of a recognition execution part of the mobile terminal that is illustrated in FIG. 1.

Next, with reference to FIG. 2 and FIG. 3, a configuration of the mobile terminal 100 will be described. First of all, a control part 110 of the mobile terminal 100 is provided with a ROM (Read Only Memory) 111, a RAM (Random Access Memory) 112, a memory 113, a communication module 114, a recognition execution part 115, an capturing control part 116, a display control part 117, an operation control part 118, an acceleration sensor control part 119, a GPS (Global Positioning System) sensor control part 120, a system control part 122, and a timer part 121. These are in the form of one or plural circuits and are in mutual connection with each other via a data bus 123. The control part 110 is a processor having one or more circuits, is capable of reading and executing a control program for processing, and is also capable of executing a pre-assembled program. Here, the circuit may be in the form of an electronic part that is made up of wired plural electronic elements or electronic substrate.

The ROM 111 stores a control program and the like, the control program for checking each the part. The RAM 112 is a work memory for use when a program is executed. The memory 113 stores on its memory region an AR program that is required for AR execution or the like. The communication module 114 establishes a communication to the information provision server 200 and the like via the INTERNET 300. That is to say, the communication module 114 transmits the provision request to the information provision server 200 and receives the AR display information from the information provision server 200.

The recognition execution part 115 reads out the AR program stored on the memory 113 to recognize the aforementioned AR marker 400a or the like. That is to say, as shown in FIG. 3, when the camera 1 captures the printed matter 400, the recognition execution part 115 recognizes the AR marker 400a on the printed matter 400. In addition, immediately when the AR marker 400a is recognized, the recognition execution part 115 creates the provision request. The provision request is to add the mobile information piece and the time information piece to the recognition information piece of the AR marker 400a. The mobile information piece is indicative of a mobile state of the mobile terminal 100. The mobile state represents a transition of the acceleration or location which is detected by the acceleration sensor 133 or the GPS sensor 134, respectively. The time information piece, which is associated with the mobile state, is identified by the timer part 121. The recognition part 115 transmits the provision request to the information provision server 200 via the communication module 114.

It is to be noted that the recognition execution part 115 may create a provision request wherein the AR indication marker recognition information piece is added with the mobile information piece of the mobile terminal but is not added with the time information piece. Here, the AR marker 400a includes an information piece that is indicative of whether or not the provision request includes the time information piece. In such a case, the recognition execution part 115 determines whether, based on the recognition information piece of the AR marker 400a, the provision request includes the time information piece or not. In addition, in a case where the provision request does not include the time information piece, the recognition execution part 115 adds the mobile state as the mobile information piece to the recognition information part. The mobile state is the location transition of the mobile terminal 100. Then, the recognition execution part 115 creates the provision request.

In addition, the recognition execution part 115 receives the AR display information from the information provision server 200. The recognition execution part 115 creates the CG image based on the AR display information. The recognition execution part 115 causes the display part 131, via the display control part 117, to display the created CG image compositely. The recognition execution part 115 composites the created CG image on the image of the printed matter 400. The printed matter 400 includes the AR marker 400a that is being captured by the camera 130. Thereby, so-called AR image is displayed. On the display part 131, at a position of the AR marker 400a of the printed matter, the AR display information is displayed as if it were printed.

It is to be noted that in a case where the acceleration sensor 133 and the GPS sensor 134 fail to detect the acceleration and the current location, respectively, at a time when the recognition execution part 115 recognizes the AR marker 400a, the recognition execution part 115 creates a provision request using only the recognition information piece of the AR marker 400a.

The capturing control part 116 controls the capturing by the camera 130. The display control part 117 controls a display operation of the display part 131. The operation control part 118 controls an operation of the operation part 132. It is to be noted that the display part 131 and the operation part 132 are configured as a touch panel.

The acceleration sensor control part 119 controls an acceleration detection operation of the acceleration sensor 133. For example, the acceleration sensor control part 119 causes the acceleration sensor 133 to detect the acceleration at intervals for a specified time period.

The GPS sensor control part 120 controls a current location detection operation of the GPS sensor 134. For example, the acceleration sensor control part 119 causes the GPS sensor 134 to detect the current location at intervals for a specified time period. The GPS sensor control part 120 arranges the resulting locations in the detection order to find a location transition of the mobile terminal 100.

The system control part 122 controls each the part based on the control program that is stored on the ROM 111.

The timer part 121 is a timer for detecting a current time instant. The timer part 121 clocks a present time instant when the current location is detected by the GPS sensor 134. In addition, the timer part 121 clocks a present time instant when the acceleration is detected by the acceleration sensor 133.

Figure 4:
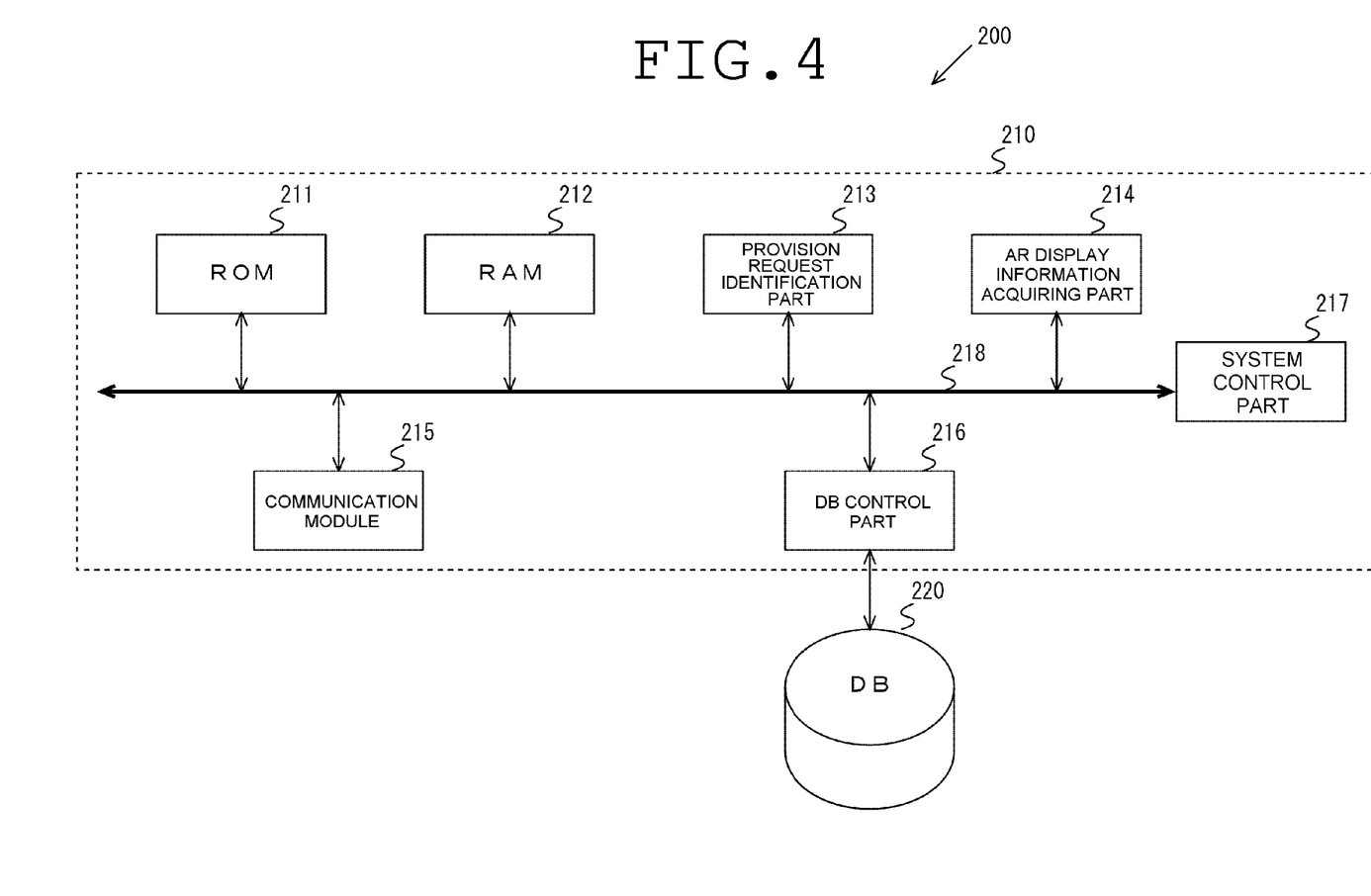
FIG. 4 illustrates an example of a configuration of the information provision server that is illustrated in FIG. 1.

Next, with reference to FIG. 4, a configuration of the information provision server 200 will be described. A control part 210 of the information provision server 200 is provided with a ROM 211, a RAM 212, a provision request identification part 213, an AR display information acquiring part 214, a communication module 215, a DB control part 216, and a system control part 217. These are in the form of one or plural circuits and are in mutual connection with each other via a data bus 218. The control part 210 is a processor having one or more circuits, is capable of reading and executing a control program for processing and is also capable of executing a pre-assembled program. Here, the circuit may be in the form of an electronic part that is made up of wired plural electronic elements or electronic substrate.

The ROM 211 stores a control program and the like, the control program for checking each the part. The RAM 212 is a work memory for use when a program is executed. The provision request identification part 213 identifies the provision request from the mobile terminal 100. The AR display information acquiring part 214 acquires the AR identification information piece, based on the identification by the provision request identification part 213, from the DB 220.

Here, in a case of the provision request wherein the recognition information piece of the AR marker 400*a* is added with the mobile information piece of the mobile terminal 100 and its corresponding time information piece, the provision request identification part 213 identifies the recognition information piece of the AR marker 400*a*, the mobile information piece, and the time information piece corresponding to the mobile state. Here, the mobile information piece is indicative of a mobile state of the mobile terminal 100. The mobile state represents a transition of the acceleration or location which is detected by the acceleration sensor 133 or the GPS sensor 134, respectively. The AR display information acquiring part 214 acquires, from the DB 220 via the DB control part 216, the AR identification information piece as a combination of the recognition information piece, the mobile information piece, and the time information piece which are identified by the provision request identification part 213.

In addition, in a case of the provision request wherein the recognition information piece of the AR marker 400*a* is added with the mobile information piece of the mobile terminal 100, the provision request identification part 213 identifies the recognition information piece of the AR marker 400*a* and the mobile information piece. Here, the mobile information piece is indicative of the mobile state of the mobile terminal 100. The mobile state represents a transition of the location which is detected by the GPS sensor 134. The AR display information acquiring part 214 acquires, from the DB 220 via the DB control part 216, the AR identification information piece as a combination of the recognition information piece and the mobile information piece which are identified by the provision request identification part 213.

Further, in a case of the provision request that is made up of only the recognition information piece of the AR marker 400*a*, the provision request identification part 213 identifies the recognition information piece of the AR marker 400*a*. The AR display information acquiring part 214 acquires, from the DB 220 via the DB control part 216, the AR identification information piece corresponding to the recognition information piece that is identified by the provision request identification part 213.

The AR display information acquiring part 214 transmits the AR display information that is acquired from the DB 220 to, via the communication module 215, the mobile terminal 100.

The communication module 215 establishes a communication to, via the INTERNET, the mobile terminal 100. That is to say, the communication module 215 receives the provision request from the mobile terminal 100 and transmits the AR display information to the mobile terminal 100.

The DB control part 216 controls reading/writing of various information pieces from/to the DB 220. The system control part 217 controls the operation of each the part based on the control program stored on the ROM 211. It is to be noted that as described above the DB 220 stores various kinds of AR display information corresponding to the AR marker 400*a* and the like.

For example, the AR display information that corresponds to the combination of the recognition information piece of the AR marker 400*a* and the mobile information piece of the mobile terminal 100 may be specialized to an information piece of the mobile of the mobile terminal 100. In this case, a user of the mobile terminal 100 is supposed to be aboard a specific ship or airplane. Thus, the AR display information is specialized to indicate an information piece that is related to an inter-station of a specific railway or inter-airport of a specific airplane. Thus, associated examples of such information piece include a sightseeing spot in an area between the stations or in the vicinity of each the airport, views seen from a cockpit of the train or airplane, and coupon tickets available between stations or on board. The communication module 215 may provide AR display information pieces one by one as the train or air plane proceeds.

In addition, the AR display information that corresponds to the combination of the recognition information piece of the AR marker 400*a*, the mobile information piece of the mobile terminal 100, and the time information piece corresponding to the mobile information piece may be specialized to an information piece of the limited time mobile of the mobile terminal 100. In this case, a user of the mobile terminal 100 is supposed to be aboard a specific ship or airplane. Thus, the AR display information is specialized to indicate an information piece that is related to an inter-station of a specific railway or inter-airport of a specific airplane. Thus, associated examples of such information piece include a guidance of an operation state of the on-aboard train or a connecting train, a guidance of an operation state of the on-aboard air-plane or a transit flight, views seen from a cockpit of the train or airplane, and coupon tickets available between stations or on board. The communication module 215 may provide AR display information pieces one by one as the train or air plane proceeds.

Further, the AR display information that corresponds to the recognition information piece of the AR marker 400*a* may be an information piece related to the printed matter 400. In this case, the user does not utilize a specific railway, route, train, or air plane. Otherwise, it is supposed not to acquire the mobile information piece due to being inside a tunnel. Thus, the AR information piece is an information piece that is not specialized to the current location of the mobile terminal 100. Examples include campaign information pieces of railway and airline companies.

Figure 5:
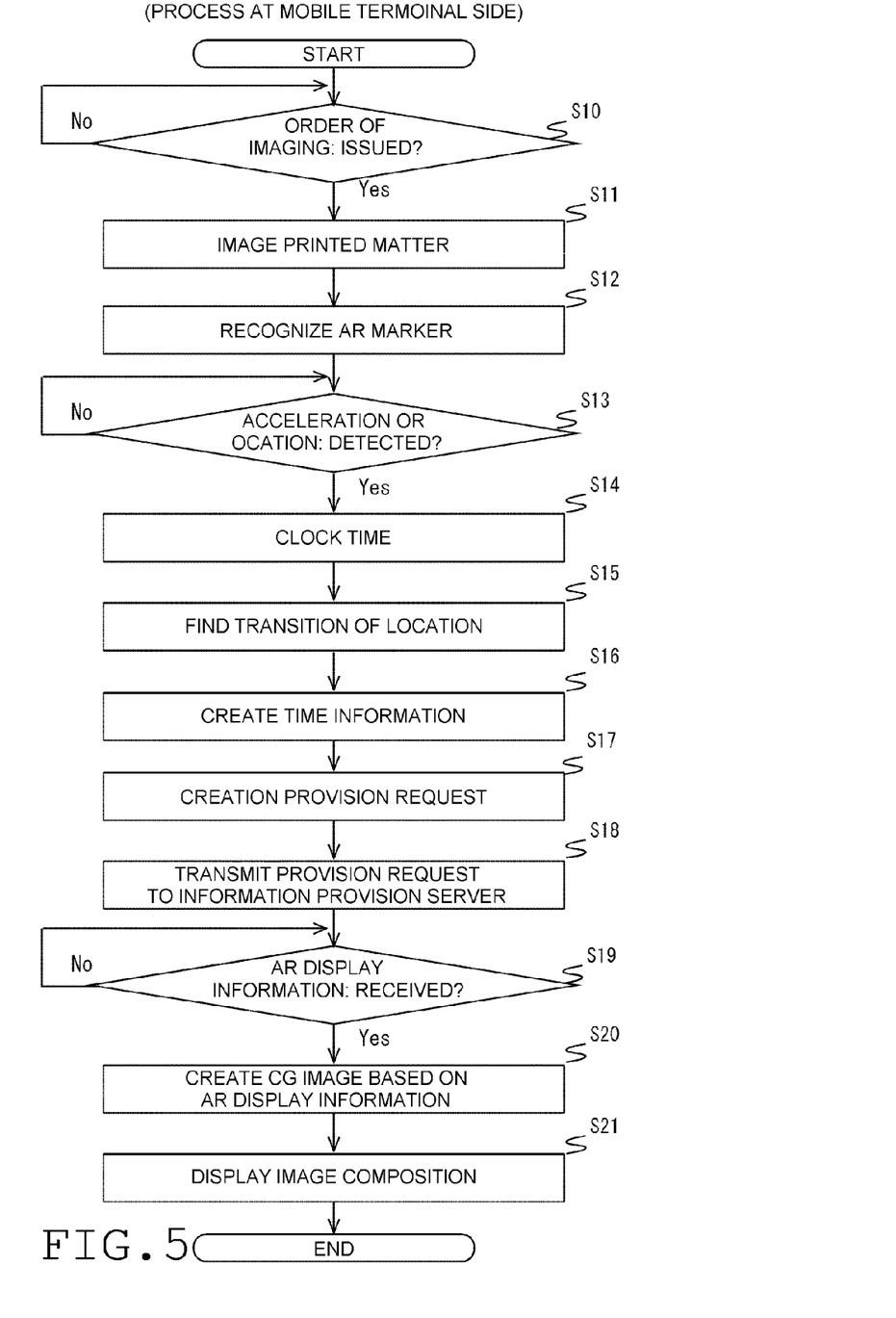
FIG. 5 illustrates sequential operation steps at aside of the mobile terminal that is illustrated in FIG. 1.

Next, with reference to FIG. 5, an operation at a side of the mobile terminal 100 will be described. It is to be noted that in the following description, the aforementioned printed matter 400 with the AR marker 400*a* is captured by the camera 130. First of all, the system control part 122 determines whether or not the operation part 132 issues a capturing instruction (step S10). If the system control part 122 does not determines the capturing instruction (Step 10: No), the system control part 122 waits for the capturing instruction. To the contrary, if the system control part 122 determines an existence of the capturing instruction (Step 10: Yes), the system control part 122 causes the capturing control part 116 to capture, that is, image, the printed matter 400 by the camera 130 (step S11).

Next, after capturing the printed matter 400 by the camera 130, the system control part 122 causes the recognition execution part 115 to recognize the AR marker 400*a* from the captured printed matter 400 (step S12). Simultaneously, the recognition execution part 115 determines whether or not the acceleration sensor 133 or the GPS sensor 134 detects the acceleration or the current location, respectively (step S13).

If the acceleration sensor 133 and the GPS sensor 134 do not detect the acceleration and the current location, respectively (step S13: No), the recognition execution part 115 waits for a detection of the acceleration or the current location. Whereas, if the acceleration sensor 133 or the GPS sensor 134 detects the acceleration or the current location, respectively (step S13: Yes), the recognition execution part 115 causes the timer part 121 to clock a time instant when the acceleration or the current location is detected (step S14). In addition, if step 13 detects the current location, the GPS sensor control part 120 arranges the current locations in the detection order to find a location transition of the mobile terminal 100 (step S15). The recognition execution part 115 creates the time information piece from the clocked time to correspond to the acceleration or location transition (step 16). Then, the recognition execution part 115 creates the provision request that is formed by adding the detected acceleration or location transition to the recognition information piece of the AR marker 400*a*. That is to say, the recognition execution part 115 adds both the mobile information piece representing the mobile state of the mobile terminal 100 and the time information piece to the recognition information part. In addition, in a case where the AR marker 400*a* that is recognized at step S12 include an information piece indicating that the provision request does not include the time information piece, the recognition execution part 115 creates the provision request in which the mobile information piece is added to the recognition information piece (step S17). It is to be noted that in a case where the acceleration sensor 133 and the GPS sensor 134 do not detect the acceleration and the current location, respectively, while the recognition execution part 115 waits for a specified time duration at step S13, the recognition execution part 115 may create the provision request using only the recognition information piece of the AR marker 400*a*.

Then, the recognition execution part 115 transmits, via the communication module 114, the created provision request to the information provision server 200 (step S18). The recognition execution part 115 also determines whether or not the AR display information is received from the information provision server 200 via the communication module 114 (step S19). Unless the AR display information is received (step 19: No), the recognition execution part 115 is in a state for waiting for receiving the AR display information. To the contrary, if the recognition execution part 115 determines the receipt of the AR display information (step S19: Yes), the recognition execution part 115 creates a CG image based on AR display information (step S20). The recognition execution part 115 causes the display control part 117 to composite the resulting CG image on the display part (step S21).

Figure 6:
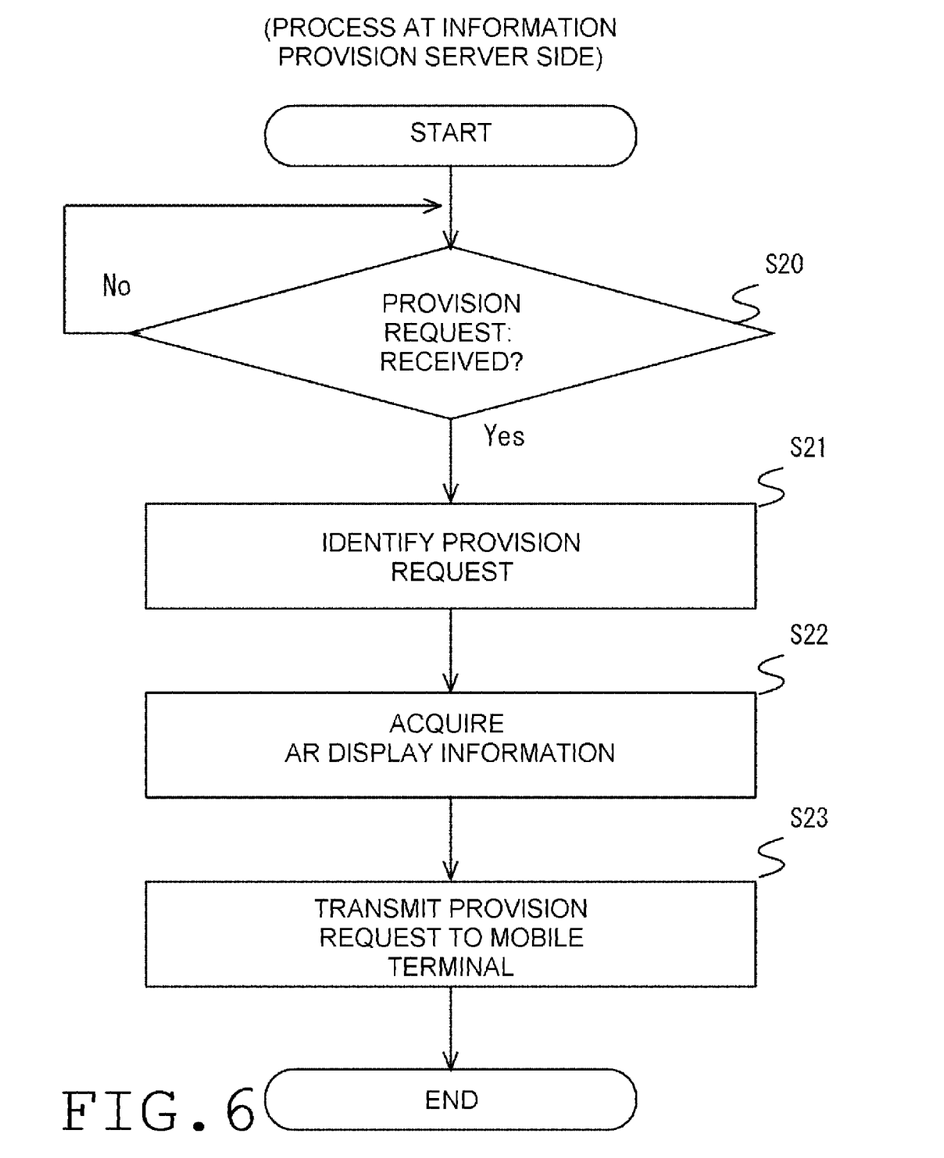
FIG. 6 illustrates sequential operation steps at a side of the information provision server that is illustrated in FIG. 1.

Next, with reference to FIG. 6, an operation at a side of the information provision server 200 will be described. The system control part 217 determines whether or not the provision request is received from the mobile terminal 100 via the communication module 215 (step S20). If the system control part 217 determines that the provision request is not received from the mobile terminal 100 via the communication module 215 (step S20: No), the system control part 217 is in a state for waiting a receipt of the provision request. To the contrary, if the system control part 217 determines that the provision request is received from the mobile terminal 100 via the communication module 215 (step S20: Yes), the system control part 217 controls the provision request identification part 213 to identify the provision request.

The provision request identification part 213 identifies the recognition information piece of the AR marker 400*a* and the acceleration transition or the location transition (the mobile information piece) from the provision request. The provision request identification part 213 also identifies, if the provision request includes the time information piece, the time information piece (step S21). That is to say, the provision request includes, as described above, the recognition information piece of the AR marker 400*a*, the mobile information piece, and/or the time information piece. The mobile information piece is based on the acceleration or the current location which are detected by the acceleration sensor 133 or the GPS sensor 134, respectively. The time information piece is based on the time that is measured by the timer part 121.

The system control part 217 causes the provision request identification part 213 to identify the information piece included in the provision request. Then, the system control part 217 causes the AR display information acquiring part 214 to operate. Immediately, the AR display information acquiring part 214 acquires the AR display information from the DB 220 via the DB control part 216. The AR display information acquiring part 214 acquires the AR display information based on the information piece that is identified by the provision request identification part 213. In detail, in a case where the provision request includes the recognition information piece, the mobile information piece, and the time information piece, the AR display information acquiring part 214 acquires the AR display information that corresponds to the combination of the recognition information piece, the mobile information piece, and the time information piece. In a case where the provision request includes the recognition information piece and the mobile information piece, and does not include the time information piece, the AR display information acquiring part 214 acquires the AR display information that corresponds to the combination of the recognition information piece and the mobile information piece. In a case where the provision request includes only the recognition information piece, the AR display information acquiring part 214 acquires the AR display information that corresponds to the recognition information piece (step S22). The AR display information acquiring part 214 also controls the system control part 217 to transmit the AR display information that AR display information acquiring part 214 acquires from the DB 220 to the mobile terminal 100 via the communication module 215 (step S23).

In such a way, in the present exemplary embodiment, the camera 130 of the mobile terminal 100 captures the AR marker 400a on the printed matter 400. Then, the recognition execution part 115 recognizes the AR marker 400a. Then, the provision request is created based on the mobile information piece and the time information pieces of the mobile terminal 100. The provision request is transmitted by the communication module 114 to the information provision server 200 as an information provision apparatus. In addition, immediately when the AR display information that corresponds to the provision request from the information provision server 200, the recognition execution part 115 creates the CG image based on the AR display information and causes the display control part 117 to composite the created CG image on the display part 13.

Thereby, the printed matter 400 with the AR marker 400a makes it possible to establish a user limitation. Thus, a special service can be provided to only limited users.

In summary, in the aforementioned typical cases, based on the time during which the mobile terminal scans the 2D code and/or the location of the mobile terminal, it is possible to transmit limited information pieces, event information pieces, and coupon tickets and the like from the server side.

However, in the typical case, 2D code such as QR code that is available for everyone is used, which makes it impossible to limit the users. Thus, it is impossible to prove a special service to limited users.

Whereas, the information acquiring program and the information provision apparatus both of which are provided by the present disclosure will cause a printed matter with a marker to establish a user limitation. Thus, a special service can be provided to only limited users.

It is to be noted that the present exemplary embodiment is described by illustrating that, for a creation of the provision request, the recognition information piece of the AR marker 400a is added with the acceleration or the current location which is detected by the acceleration sensor 133 or the GPS sensor 134, respectively. However, instead of this case, for the creation of the provision request, the recognition information piece of the AR marker 400a may be added with a detected information piece from a temperature sensor, an illumination sensor, a humidity sensor, a pressure sensor, or the like. This case makes it possible to establish an information provision that is specialized to an information piece of temperature, illumination, humidity, pressure, or the like.

In addition, in the present exemplary the recognition execution part 115 composites the captured image of the AR marker 400a with the CG image and displays the resulting image. However, a display can be established without a composition of the CG image. For example, the CG image may be displayed on a fixed position on the display screen when the captured image by the camera 130 comes to exclude the AR marker 400a after the user shifts the camera 130 from viewing the AR marker 400a.

Further, in the present exemplary embodiment, the mobile state of the mobile terminal 100 is determined by the acceleration transition or the location transition which are detected by the acceleration sensor 133 or the GPS sensor 134, respectively. However, such the determination may be obtained using the acceleration transition and the location transition. In this case, the GPS sensor 134 is concurrently available as an acceleration sensor by causing the GPS sensor 134 to detect an acceleration base on a change of amount in the location.

What is claimed is:

1. A non-transitory computer-readable recording medium that stores an information acquiring program executable by a computer that controls a mobile terminal, the information acquiring program comprising:
    a first program code that causes the computer to use a camera to thereby capture an image of a marker on a printed matter;
    a second program code that causes the computer to detect a mobile state of the mobile terminal;
    a third program code that causes the computer to recognize the marker and to create a provision request based on a recognition information piece of the recognized marker and a mobile information piece that is indicative of the mobile state of the mobile terminal that is detected by the second program code;
    a fourth program code that causes the computer to transmit the provision request to an information provision apparatus and to receive an indication information piece that is a reaction to the provision request from the information provision apparatus; and
    a fifth program code that causes the computer to create an information image piece based on the indication information piece and causes a display part to display the information image piece.

2. The non-transitory computer-readable recording medium according to claim 1, wherein the second program code causes the computer to determine actual locations of the mobile, to arrange the resulting locations based on the detection order for finding a location transition of the mobile terminal, and to detect the mobile terminal state.

3. The non-transitory computer-readable recording medium according to claim 1, wherein the second program code causes the computer to detect acceleration as the mobile state.

4. The non-transitory computer-readable recording medium according to claim 1,
    wherein the information acquiring program further includes a sixth program code that causes the computer to identify a time corresponding to the mobile state of the mobile terminal, and wherein the third program code causes the computer to create the provision request.

5. The non-transitory computer-readable recording medium according to claim 1,
    wherein the information acquiring program further includes a seventh program code that causes the computer to capture the printed matter, and wherein the third program code causes the computer to composite the information image piece with the captured image of the printed matter for displaying the resulting composite image on the display part.

6. An information provision apparatus, comprising a processor with one or more circuits, the processor including:
    a communication module that receives a provision request from a mobile terminal, the provision request being based on a recognition information piece of a marker on a printed matter and a mobile information piece of a mobile terminal;
    a provision request identification part that identifies the recognition information piece and the mobile information piece from the provision request; and
    an indication information acquiring part that acquires the indication information piece from a data base which corresponds to a combination of the recognition information piece and the mobile information piece.

7. The information provision apparatus according to claim 6, wherein the mobile information further includes a mobile state that is indicative of a location transition of the mobile terminal.

8. The information provision apparatus according to claim 6, wherein the mobile information further includes a mobile state that is indicative of an acceleration of the mobile terminal.

9. The information provision apparatus according to claim 6,
wherein the distinguished information piece corresponds to the marker that is captured by a camera of the mobile terminal, and
wherein the mobile information piece corresponds to the mobile state of the mobile terminal which is detected by a location detection part of the mobile terminal.

10. The information provision apparatus according to claim 6, wherein the communication module receives, from the mobile terminal, the recognition information piece, the mobile information piece of a mobile terminal, and the provision request based on a time information piece that is indicative of a time corresponding to the mobile state, wherein the provision request identification part distinguishes between the recognition information piece, the mobile information piece, and the time information piece, and wherein the indication information acquiring part acquires the indication information piece from the data base which corresponds to the combination of the recognition information piece, the mobile information piece, and the time information piece.

11. The information provision apparatus according to claim 10, wherein the time information piece identified by the timer part of the mobile terminal is a time corresponding to the mobile state of the mobile terminal.

\* \* \* \* \*